(12) United States Patent
Makino

(10) Patent No.: US 6,408,231 B2
(45) Date of Patent: Jun. 18, 2002

(54) IMAGE SIGNAL PROCESSING CIRCUIT AND VEHICLE RUNNING GUIDING APPARATUS

(75) Inventor: Satoshi Makino, Tokyo (JP)

(73) Assignee: Calsonic Kansei Corporation, Tokyo (JP)

( * ) Notice: Subject to any disclaimer, the term of this patent is extended or adjusted under 35 U.S.C. 154(b) by 0 days.

(21) Appl. No.: 09/808,322

(22) Filed: Mar. 14, 2001

(30) Foreign Application Priority Data

Mar. 16, 2000 (JP) ........................................ 2000-074146

(51) Int. Cl.⁷ ............................................... G06F 19/00

(52) U.S. Cl. ........................... 701/28; 382/104; 348/118

(58) Field of Search ........................ 701/28, 1; 345/538, 345/555; 382/304, 104, 106, 154; 348/51, 113, 118, 213

(56) References Cited

U.S. PATENT DOCUMENTS 4,897,719 A * 1/1990 Griffin ...................... 250/208.1

* cited by examiner

*Primary Examiner*—Tan Nguyen
(74) *Attorney, Agent, or Firm*—Pyle & Piontek

(57) ABSTRACT

A program is normally executed in each of a plurality of microprocessors. When image data of a three-dimensional object and distance distribution information indicating a distribution of distance between a vehicle and the three-dimensional object are received in a DMA transfer circuit, the normal operation of the microprocessors is interrupted, and the image data and the distance distribution information are written in memories of the microprocessors. Thereafter, the normal operation of the microprocessors is restarted, and information indicating the writing of the image data and the distance distribution information in the memories is sent to the microprocessors. Therefore, the image data and the distance distribution information can be efficiently written in the memories, and the processing in the microprocessors can be smoothly performed.

10 Claims, 7 Drawing Sheets

IMAGE SIGNAL PROCESSING CIRCUIT AND VEHICLE RUNNING GUIDING APPARATUS

BACKGROUND OF THE INVENTION

1. Field of the Invention

The present invention relates to an image signal processing circuit and a vehicle running guiding apparatus in which a three-dimensional object placed in the forward direction of travel of a vehicle is detected, for example, with a charge coupled device (CCD) mounted on the vehicle to give the alarm when there is a possibility of danger or when the vehicle goes off a white line denoting a boundary of a road area.

2. Description of Related Art

A vehicle running guiding apparatus using an image signal processing circuit is described in brief with reference to FIG. 6 and FIG. 7.

FIG. 6 is a block diagram briefly showing a conventional image signal processing circuit arranged in a vehicle running guiding apparatus, and FIG. 7 is a block diagram of the conventional image signal processing circuit shown in FIG. 6. As shown in FIG. 6, a conventional image signal processing circuit is composed of a stereo optical system 1 for photographing a plurality of three-dimensional objects placed in the forward direction of travel of a user's vehicle to produce a stereo image of the three-dimensional objects at regular time-intervals, a stereo image processing unit 2, having a stereo image processing function, for calculating a three-dimensional distribution of distance between the user's vehicle and the group of three-dimensional objects according to data of the stereo image produced in the stereo optical system 1 for each frame of stereo image, a distance-and-image processing computer 3 for receiving the three-dimensional distance distribution calculated in the stereo image processing unit 2 as distance distribution information and calculating both a right-side clearance distance and a left-side clearance distance according to the distance distribution information, and an informing unit 4 for sending information of the right-side clearance distance and the left-side clearance distance calculated in the distance-and-image processing computer 3 to a driver (or the user). The distance-and-image processing computer 3 is composed of a three-dimensional object detecting unit 3A for quickly detecting a three-dimensional position of a side wall, which denotes a long-continued three-dimensional object arranged on a side of a road (for example, a fence or a guard rail indicating a boundary of a road), and a plurality of three-dimensional positions of a group of three-dimensional objects placed on a road (for example, other vehicles, pedestrians and buildings) according to the distance distribution information, and a clearance distance calculating unit 3B for calculating a right-side nearest distance between an extending line of a right-side end of the user's vehicle in the forward direction and the group of three-dimensional objects, of which the three-dimensional positions are detected in the three-dimensional object detecting unit 3A, as the right-side clearance distance, calculating a left-side nearest distance between an extending line of a left-side end of the user's vehicle in the forward direction and the group of three-dimensional objects as the left-side clearance distance.

As shown in FIG. 7, the stereo optical system 1 is composed of a camera 1a, which is placed on the right side of the user's vehicle, for photographing the three-dimensional objects at regular time-intervals to produce a right-side image of the stereo image, and a camera 1b, which is placed on the left side of the vehicle, for photographing the three-dimensional objects at regular time-intervals to produce a left-side image of the stereo image. The stereo image processing unit 2 is composed of a distance detecting circuit 2a for calculating an image difference between the right-side image and the left-side image composing the stereo image and detecting a three-dimensional distribution of the distance between the user's car and the group of three-dimensional objects according to the image difference, and a distance-and-image memory 2b for storing the image data and distance distribution information denoting the three-dimensional distribution of the distance detected in the distance detecting circuit 2a. The distance-and-image processing computer 3 has a microprocessor 3a, which corresponds to the three-dimensional object detecting unit 3A, for detecting the three-dimensional position of the group of three-dimensional objects placed on the road according to the object detecting processing, a microprocessor 3b, which corresponds to the three-dimensional object detecting unit 3A, for detecting the three-dimensional position of the side wall according to the side wall detecting processing, and a microprocessor 3c, which corresponds to the clearance distance calculating unit 3B for calculating the clearance distance between the user's vehicle and the group of three-dimensional objects including the side wall.

Also, the distance-and-image processing computer 3 has an interface circuit 3e connected with the distance-and-image memory 2b, a read only memory (ROM) 3f for storing a control program, a random access memory (RAM) 3g for storing a plurality of types of parameters which are used in the calculation performed in the microprocessors 3a, 3b and 3c, an output memory 3h for storing a plurality of parameters obtained as a result of the calculation, a display controller 3i for controlling the informing unit 4, and an interface circuit 3j for receiving a signal sent from a vehicle speed sensor 5, a rudder angle sensor 6 or a mode setting switch 7. A rudder angle of a steering wheel is detected in the rudder angle sensor 6. The mode setting switch 7 is used to select a supporting mode. The microprocessors 3a, 3b and 3c, the interface circuit 3e, the ROM 3f, the RAM 3g, the output memory 3h, the display controller 3i and the interface circuit 3j are connected in parallel with each other through a system bus 3d. Also, memory areas of both the ROM 3f and RAM 3g used for the microprocessor 3a, memory areas of both the ROM 3f and RAM 3g used for the microprocessor 3b and memory areas of both the ROM 3f and RAM 3g used for the microprocessor 3c differ from each other. Therefore, in the distance-and-image processing computer 3, the object detecting processing and the side wall detecting processing are performed in parallel to each other according to the image data and the distance distribution information of the stereo image processing unit 2. When the mode setting switch 7 is operated by the driver to output a prescribed signal, the processing for calculating a clearance distance between the vehicle and the three-dimensional object is performed in response to the prescribed signal according to the image data of the three-dimensional objects and the distance distribution information, and information of the clearance distance is displayed in the informing unit 4.

However, in the conventional image signal processing circuit, data or information is sent through the single system bus (or bus line) 3d in the distance-and-image processing computer 3. Therefore, even though it is desired to send the image data and the distance distribution information from the stereo image processing unit 2 to the RAM 3g through the system bus 3d when communication is performed between the RAM 3g and the microprocessor 3a (or 3b or 3c), it is impossible to immediately send the image data and the distance distribution information, and the sending of the image data and the distance distribution information is delayed until the system bus 3d is set to a non-use state by the completion of the communication performed through the system bus 3d. Therefore, there is a problem that the distance-and-image processing computer 3 is not efficiently performed.

SUMMARY OF THE INVENTION

An object of the present invention is to provide, with due consideration to the drawbacks of the conventional image signal processing circuit, an image signal processing circuit and a vehicle running guiding apparatus in which image data is sent to a RAM without wasting time to smoothly perform signal processing in each central processing unit (or microprocessor). That is, the operation of a central processing unit is interrupted, the image data is efficiently sent to a RAM by using a direct memory access (DMA) transfer circuit, the operation of the central processing unit is restarted, information indicating the sending of the image data to the RAM is sent to the central processing unit, and the data processing is smoothly performed in the central processing unit according to the image data.

The object is achieved by the provision of an image signal processing circuit comprising a plurality of image data outputting units for outputting a plurality of pieces of image data, an image processor for outputting the pieces of image data output from the image data outputting units as a frame of image data, a plurality of random access memories for respectively storing the frame of image data output from the image processor, and a plurality of central processing units, which are arranged in one-to-one correspondence with the random access memories, for respectively performing signal processing according to the frame of image data stored in the corresponding random access memory. The image signal processing circuit further comprises a direct memory access transfer circuit, which is arranged between the image processor and the group of central processing units, for interrupting the signal processing of one central processing unit, writing the frame of image data output from the image processor in one random access memory corresponding to the central processing unit, making the central processing unit restart the signal processing after the writing of the frame of image data in the random access memory and sending information, which indicates that the frame of image data is written in the random access memory during the interruption of the central processing unit, to the central processing unit.

In the above configuration, the direct memory access transfer circuit is arranged to write image data to the random access memory corresponding to each central processing unit by interrupting the execution of a program used in the central processing unit. Accordingly, the processing time required to process the image data and the distance distribution information in each microprocessor can be shortened. That is, the image data can be efficiently sent to the random access memory of each central processing unit through the direct memory access transfer circuit, and the processing for the image data can be smoothly performed in each central processing unit.

It is preferred that the direct memory access transfer circuit of the image signal processing circuit writes the same frame of image data output from the image processor in each of the random access memories, and a type of the signal processing, which is performed in each central processing unit according to the frame of image data written in the corresponding random access memory, differs from types of the signal processing performed in the other central processing units. For example, it is preferred that a distance calculation is performed in one of the central processing units, and the formation of a three-dimensional image is performed in another central processing unit.

Therefore, various types of signal processing can be efficiently performed in the central processing units.

It is also preferred that the image signal processing circuit further comprises a DPRAM, which is connected with the central processing units, for storing a plurality of calculation results obtained according to the signal processing performed in the central processing units so as to be possible to use any of the calculation results in each central processing unit.

Therefore, a calculation result of one central processing unit can be efficiently used in another central processing unit through the DPRAM.

It is also preferred that the image signal processing circuit further comprises an interruption control circuit, which is connected with the central processing units, for controlling the interruption of each central processing unit to interrupt one central processing unit in cases where a calculation result obtained according to the signal processing performed in another central processing unit is supplied to the interrupted central processing unit.

Therefore, because the signal processing in the central processing unit, in which a calculation result of another central processing unit is received, is interrupted, the transmission of the calculation result between the central processing units can be efficiently performed.

It is also preferred that the image signal processing circuit further comprises a display control unit for controlling the display of a calculation result which is obtained in each central processing unit according to the signal processing and is sent from the central processing unit through a DPRAM at regular intervals, wherein the display control unit has a failure judging unit for judging that a failure occurs in one central processing unit in cases where the calculation result of the central processing unit is not sent to the DPRAM.

Therefore, the occurrence of a failure in one central processing unit, in which a calculation result is not obtained, can be immediately ascertained in the image signal processing circuit.

It is also preferred that the image signal processing circuit further comprises a display control unit for setting an address corresponding to one central processing unit, and a bus access gate circuit for outputting a bus release request signal to the central processing unit corresponding to the address set by the display control unit, outputting a signal to the direct memory access transfer circuit to interrupt a direct memory access transfer of the direct memory access transfer circuit, ascertaining that the central processing unit releases a bus, and reading out or writing data from/in a memory or the random access memory corresponding to the central processing unit.

Therefore, because the direct memory access transfer of the direct memory access transfer circuit is interrupted, data of the display control unit can be written in a memory of the central processing unit through the bus access gate circuit, or data written in a memory of the central processing unit can be read out to the display control unit through the bus access gate circuit. Accordingly, data transmission between the display control unit and a memory of each central processing unit can be efficiently performed even though the direct memory access transfer is performed by the direct memory access transfer circuit.

It is also preferred that the image signal processing circuit further comprises a bus access gate circuit for supplying diagnosis data and an address of the diagnosis data to one central processing unit corresponding to a diagnosis operation, writing the diagnosis data in the address of a memory of the central processing unit, and reading out the diagnosis data from the memory of the central processing unit, and a comparing circuit for comparing the diagnosis data read out by the bus access gate circuit with the diagnosis data supplied to the central processing unit by the bus access gate circuit to perform the diagnosis of the memory of the central processing unit.

Therefore, it is judged in a display control unit having the comparing unit whether or not a failure occurs in the memory of the central processing unit.

It is also preferred that a vehicle running guiding apparatus comprises a stereo image processing unit for calculating a three-dimensional distance distribution in a stereo image which is obtained by photographing a three-dimensional object, which is placed in a forward direction of travel of a vehicle, with a pair of photographing units arranged on the right and left sides of the vehicle, a three-dimensional object detecting unit for detecting a three-dimensional position of the three-dimensional object placed on a road according to the three-dimensional distance distribution calculated by the stereo image processing unit, a clearance distance calculating unit for calculating a right-side nearest distance between an end of the three-dimensional object, of which the three-dimensional position is detected by the three-dimensional object detecting unit, and an extending line of a right end of the vehicle, calculating a left-side nearest distance between another end of the three-dimensional object and an extending line of a left end of the vehicle and setting both the right-side nearest distance and the left-side nearest distance as a clearance distance, and an informing unit for informing information indicating the clearance distance calculated by the clearance distance calculating unit. The image processor is applied to the stereo image processing unit, one central processing unit is applied to the three-dimensional object detecting unit, and another central processing unit is applied to the clearance distance calculating unit.

In the above configuration, the three-dimensional distance distribution calculated in the stereo image processing unit corresponds to the image data output from the image processor, the three-dimensional position of the three-dimensional object detected by the three-dimensional object detecting unit corresponds to a calculation result obtained in one central processing unit according to the signal processing, and the clearance distance calculated by the clearance distance calculating unit corresponds to a calculation result obtained in another central processing unit according to the signal processing.

Accordingly, the image signal processing circuit can be applied to the vehicle running guiding apparatus.

DETAILED DESCRIPTION OF THE PREFERRED EMBODIMENTS

Embodiments of the present invention will now be described with reference to the accompanying drawings.
Embodiment 1

Figure 1:
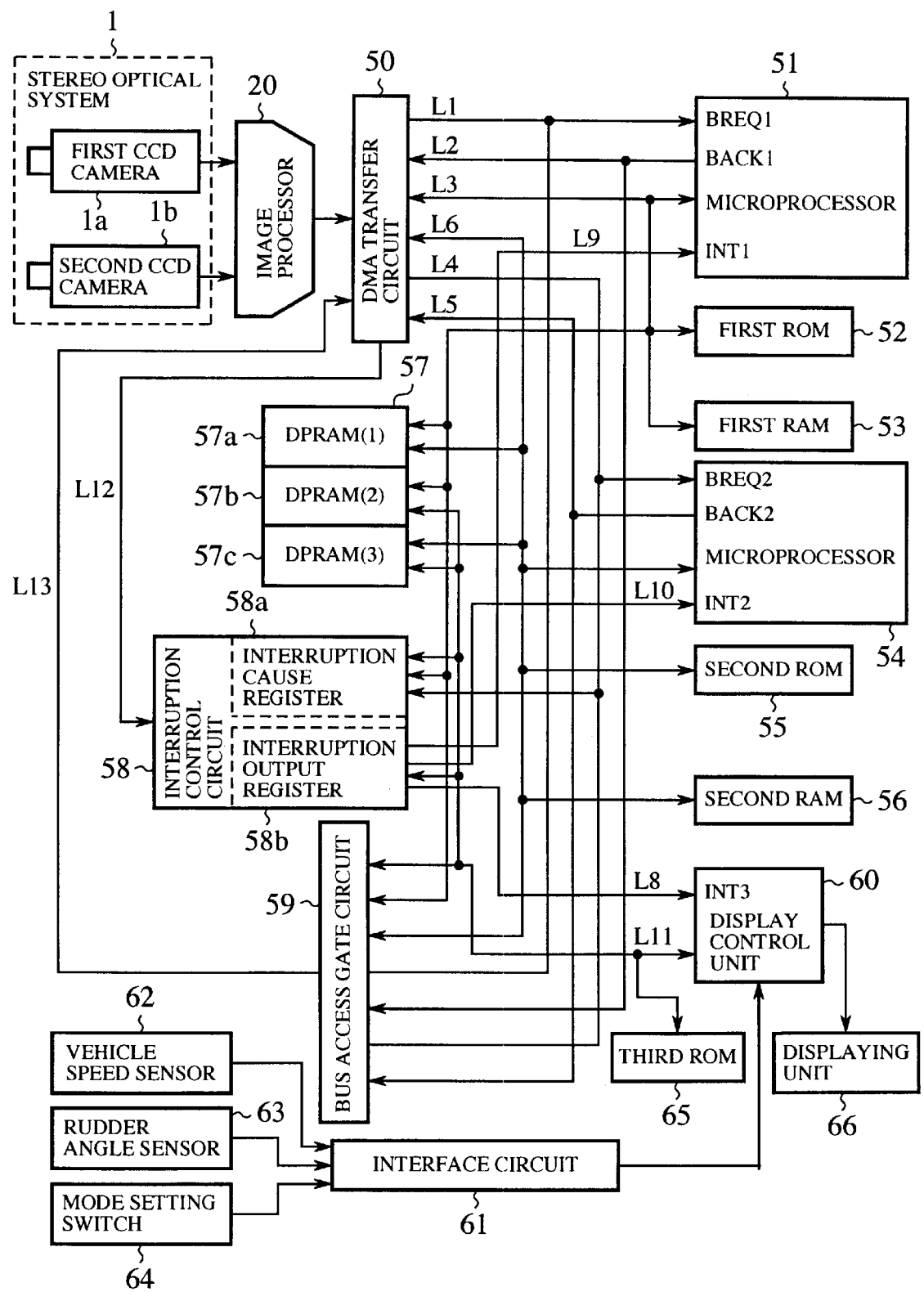
FIG. 1 is a block diagram of an image signal processing circuit according to a first embodiment of the present invention.
Figure 2:
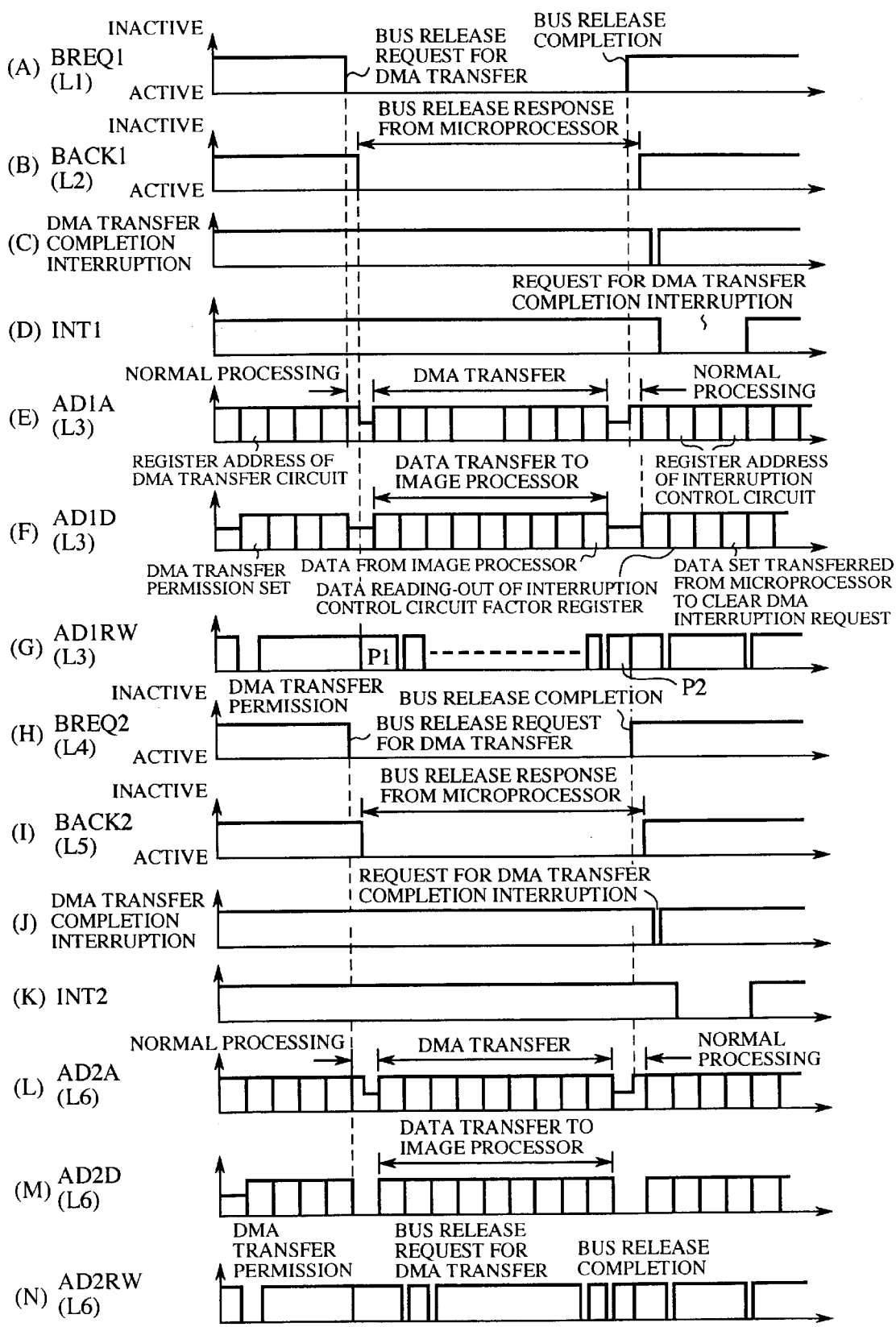
FIG. 2(A) to FIG. 2(N) are a plurality of timing charts showing an operation of the image signal processing circuit shown in FIG. 1.
Figure 3:
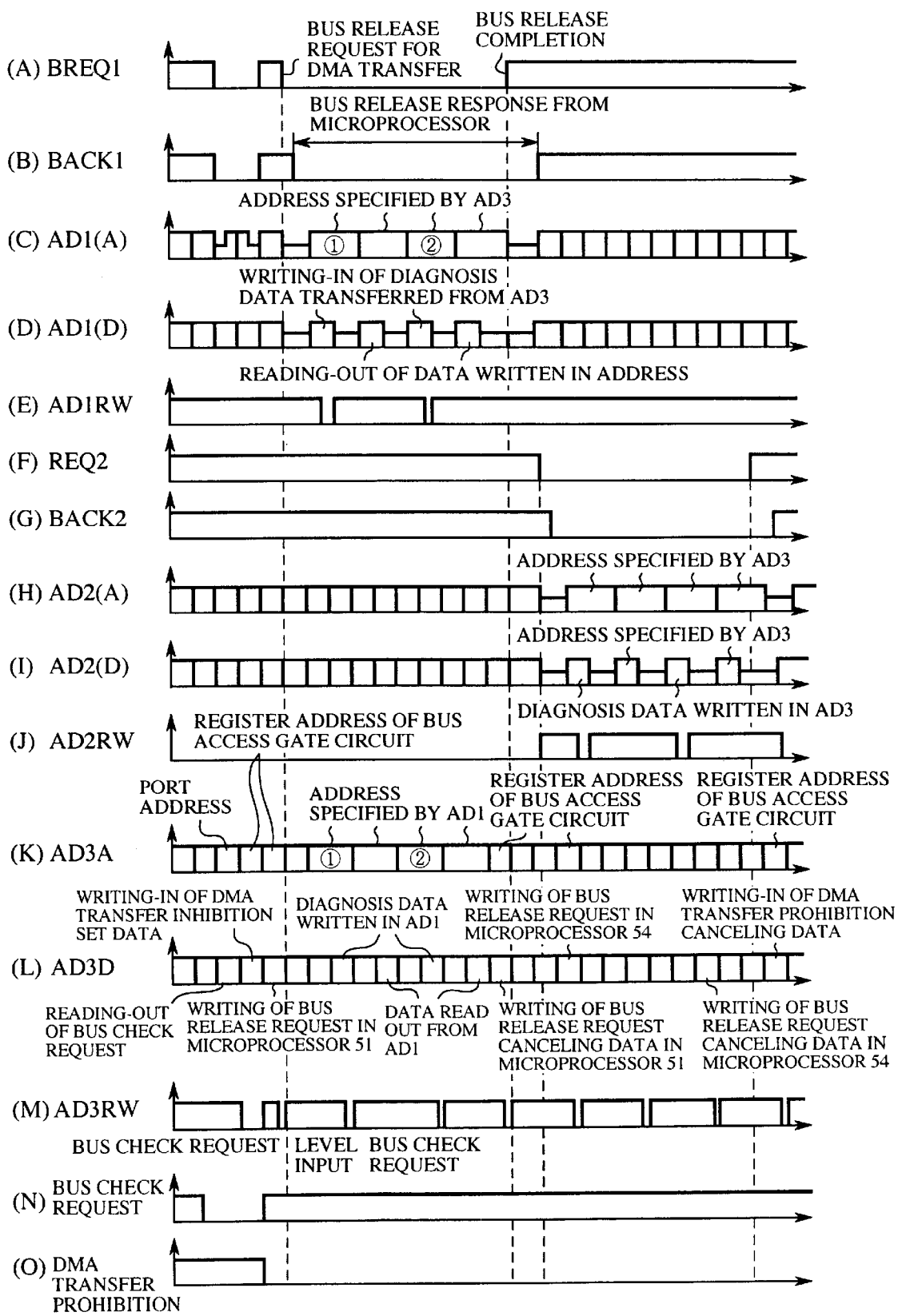
FIG. 3(A) to FIG. 3(O) are a plurality of timing charts showing another operation of the image signal processing circuit shown in FIG. 1.
Figure 4:
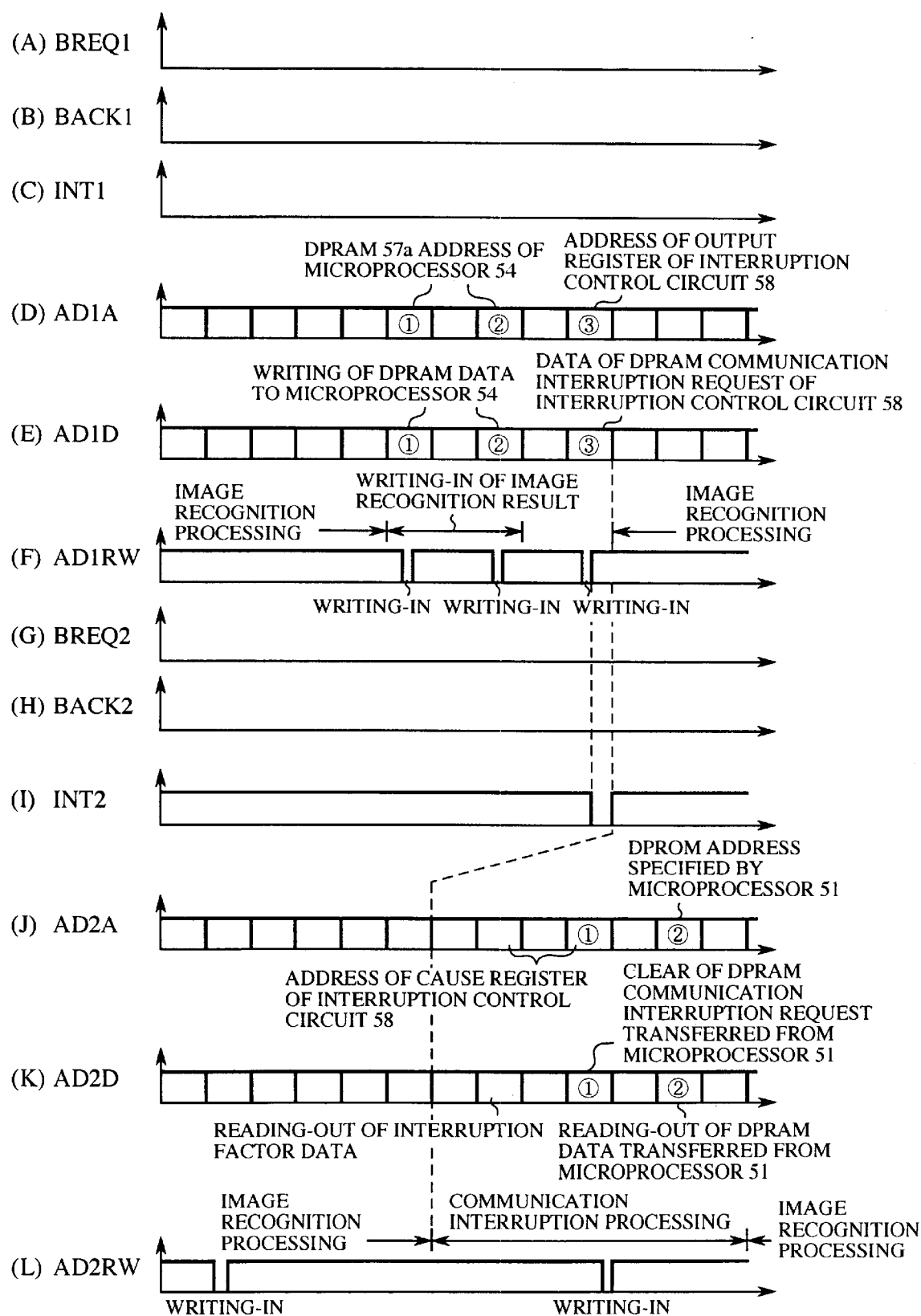
FIG. 4(A) to FIG. 4(L) are a plurality of timing charts showing a DMA transfer operation of the image signal processing circuit shown in FIG. 1.
Figure 5:
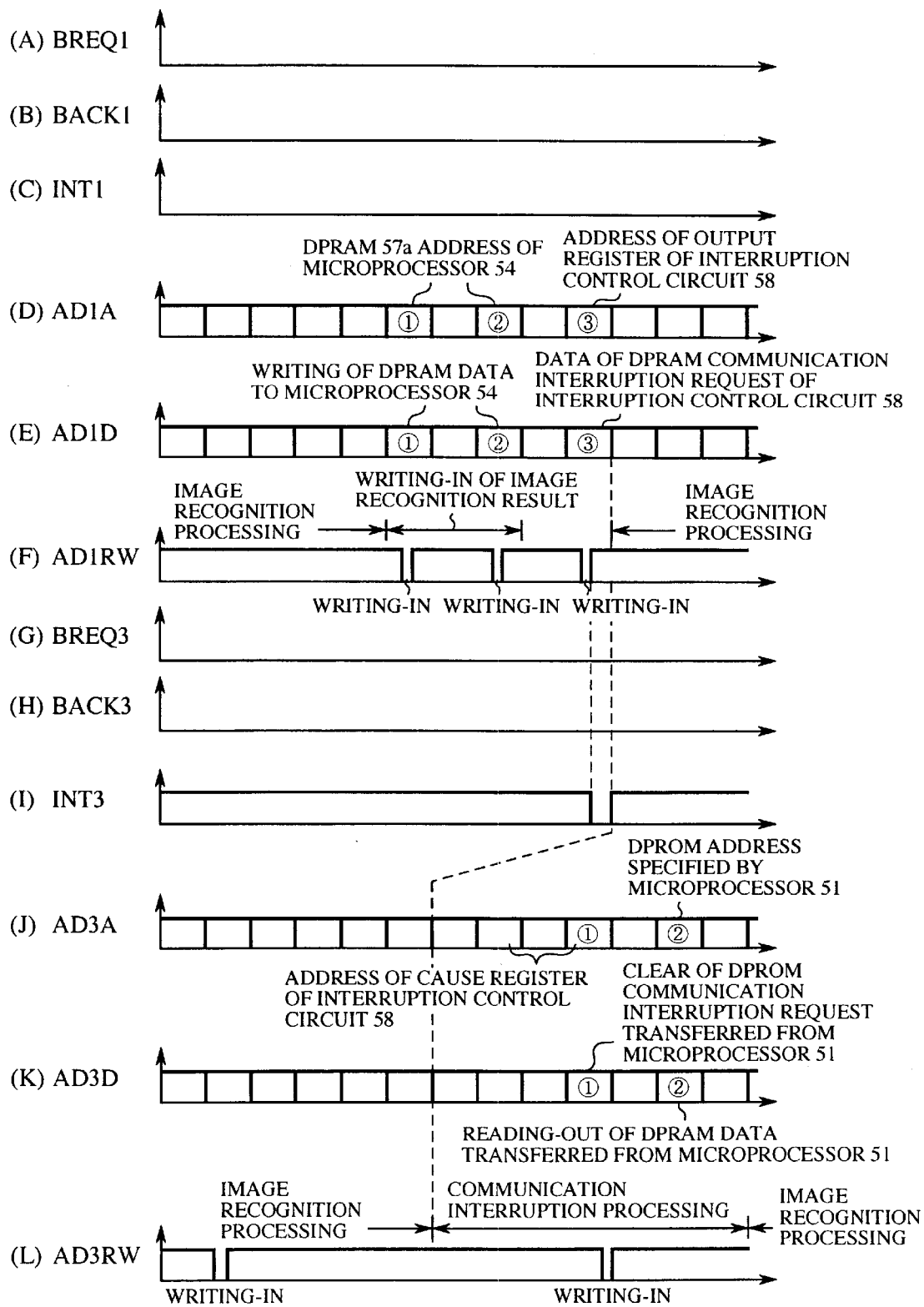
FIG. 5(A) to FIG. 5(L) are a plurality of timing charts showing another DMA transfer operation of the image signal processing circuit shown in FIG. 1.
Figure 6:
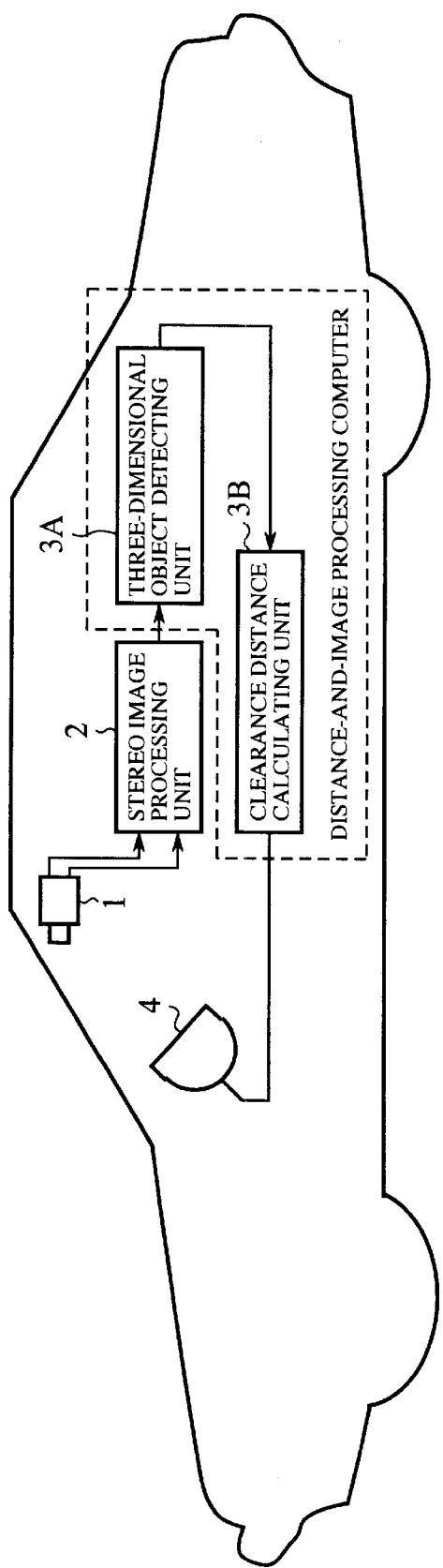
FIG. 6 is a block diagram briefly showing a conventional image signal processing circuit arranged in a vehicle running guiding apparatus.
Figure 7:
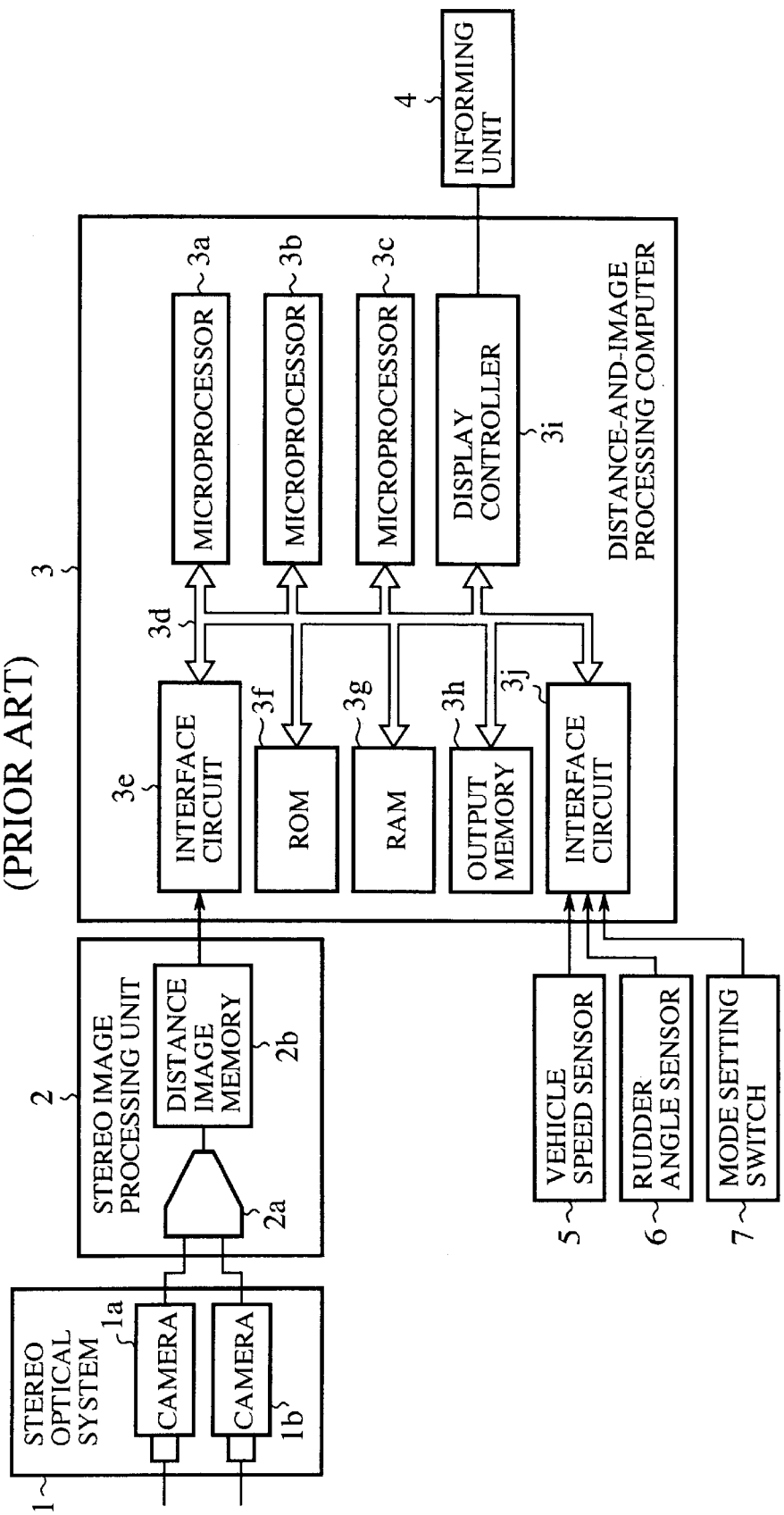
FIG. 7 is a block diagram of the conventional image signal processing circuit shown in FIG. 6.

FIG. 1 is a block diagram of an image signal processing circuit according to a first embodiment of the present invention. In FIG. 1, constituent elements, which are indicated by the same reference numerals as those of FIG. 6, are the same as or equivalent to those of FIG. 6, and additional description of those elements is omitted.

Image data (a stereo image of a three-dimensional object or a white line) is obtained in the stereo optical system 1, and distance distribution information is produced in an image processor 20 from the image data. In cases where the image data and the distance distribution information are transmitted from the image processor 20 to a direct memory access (DMA) transfer circuit 50, prior to the transmission of the image data and the distance distribution information to a first microprocessor 51 (or a second microprocessor 54), a bus right request signal BREQ1 (or a bus right request signal BREQ2) is sent from the DMA transfer circuit 50 to the first microprocessor 51 (or the second microprocessor 54) through a signal line (or a bus line) L1 (or a signal line L4) to require a bus usable right of the first microprocessor 51 (or the second microprocessor 54). In other words, the DMA transfer circuit 50 requires of the first microprocessor 51 (or the second microprocessor 54) to set a signal of the signal line L1 (or the signal line L4), which is set in an inactive state and is not used to send a signal from the DMA transfer circuit 50, to an active state and to abandon the bus right.

When the bus right request signal BREQ1 (or the bus right request signal BREQ2) is received in the first microprocessor 51 (or the second microprocessor 54), a bus right acknowledgement signal BACK 1 (or BACK2), which is output to a signal line L2 (or a signal line L5), is set to an active state by the first microprocessor 51 (or the second microprocessor 54), the execution of a program performed between the first microprocessor 51 (or the second microprocessor 54) and a first ROM 52 (or a second ROM 55) through a signal line L3 (or a signal line L6) is interrupted, a bus usable right (that is, a bus right) held by the first microprocessor 51 (or the second microprocessor 54) is given to the DMA transfer circuit 50, and the image data and the distance distribution information transmitted from the DMA transfer circuit 50 are received in the first microprocessor 51 (or the second microprocessor 54) through the signal line L1 (or the signal line L4).

Also, when the image data and the distance distribution information received in the first microprocessor 51 (or the second microprocessor 54), which abandons the bus right, are written in a first RAM 53 (or a second RAM 56) through the signal line L3 (or the signal line L6), an abandon signal is output from the DMA transfer circuit 50 to the first microprocessor 51 (or the second microprocessor 54) corresponding to the first RAM 53 (or the second RAM 56), in which the writing of the image data and the distance distribution information is completed, to abandon the bus right request signal BREQ1 (or BREQ2) output by the DMA transfer circuit 50. In other words, the bus right request signal BREQ1 (or BREQ2) of the signal line L1 (or the signal line L4) set in the active state is set to the inactive state by the DMA transfer circuit 50.

As a result, when the signal indicating the abandonment of the bus right request signal BREQ1 is, for example, received in the first microprocessor 51, the bus right acknowledgement signal BACK1 output through the signal line L2 is set to an inactive state by the first microprocessor 51, and the execution of the program in the first microprocessor 51 is restarted.

In addition, each time the writing of the image data and the distance distribution information in the first RAM 53 (or the second RAM 56) is completed, a DMA transfer completion signal is sent from the DMA transfer circuit 50 to an interruption cause register 58*a* of an interruption control circuit 58 through a signal line L12, and the DMA transfer completion signal is stored in the interruption cause register 58*a*.

Thereafter, when the DMA transfer completion signal is received in the interruption control circuit 58 through the signal line L12, a DMA transfer completion interruption signal is sent from the interruption control circuit 58 to an interruption terminal INT1 (or an interruption terminal INT2) of the first microprocessor 51 (or the second microprocessor 54) through a signal line L9 (or a signal line L10).

Also, the second microprocessor 54 is operated in response to information sent from the DMA transfer circuit 50 in the same manner as the operation of the first microprocessor 51. That is, when the bus right request signal BREQ2 sent from the DMA transfer circuit 50 is received in the second microprocessor 54, the execution of a program performed in the second microprocessor 54 with the second ROM 55 by using the signal line L6 is interrupted, the bus right acknowledgement signal BACK2 is sent from the second microprocessor 54 to the DMA transfer circuit 50 through the signal line L5 to give the bus right to the DMA transfer circuit 50. Also, the second RAM 56 has the same function as that of the first RAM 53. Therefore, the image data output from both a first CCD camera 1*a* and a second CCD camera 1*b* of the stereo optical system 1 and the distance distribution information produced from the image data in the image processor 20 are stored in the first RAM 53 and the second RAM 56.

When the writing of the image data and the distance distribution information in the first RAM 53 is completed, the bus right request signal BREQ1, which is output to the first microprocessor 51 through the signal line L1, is abandoned by the DMA transfer circuit 50. That is, the bus right request signal BREQ1 is set to the inactive state. Also, in the same manner, when the writing of the image data and the distance distribution information in the second RAM 56 is completed, the bus right request signal BREQ2, which is output to the second microprocessor 54 through the signal line L4, is abandoned by the DMA transfer circuit 50. That is, the bus right request signal BREQ2 is set to the inactive state.

When a signal (denoting the bus right request signal set to the inactive state) indicating the abandonment of the bus right request signal is received in the first microprocessor 51 (or the second microprocessor 54) through the signal line L1 (or the signal line L4), the bus right acknowledgement signal BACK1 (or BACK2) output from the first microprocessor 51 (or the second microprocessor 54) is set to the inactive state, the execution of the program interrupted is restarted in the first microprocessor 51 (or the second microprocessor 54). Thereafter, when the DMA transfer completion interruption signal supplied from the interruption control circuit 58 to the interruption terminal INT1 of the first microprocessor 51 is set to the active state, the first microprocessor 51 accesses the interruption cause register 58*a* of the interruption control circuit 58 through the signal line L3. In cases where the DMA transfer completion signal is stored in the interruption cause register 58*a*, it is possible to read out the image data and the distance distribution information, which are written in the first RAM 53 according to the DMA transfer, from the first RAM 53. Also, a bit, which corresponds to a memory area of the interruption cause register 58*a* in which the DMA transfer completion signal is stored, is cleared by the first microprocessor 51 through the signal line L9, so that the DMA transfer completion interruption signal supplied to the interruption terminal INT1 of the first microprocessor 51 is set to the inactive state. Also, image processing (or signal processing) is performed in the first microprocessor 51 according to the image data and the distance distribution information read out from the first RAM 53 to detect a three-dimensional position of a white line (or a side wall) denoting a boundary of a road area, and a result of the image processing (or a calculation result) is written in a prescribed area of a DPRAM (1) 57*a* and a prescribed area of a DPRAM (2) 57*b* through the signal line L3.

Also, when the DMA transfer completion interruption signal supplied from the interruption control circuit 58 to the interruption terminal INT2 of the second microprocessor 54 is set to the active state, the second microprocessor 54 accesses the interruption cause register 58*a* of the interruption control circuit 58 through the signal line L4. In cases where the DMA transfer completion signal is stored in the interruption cause register 58*a*, it is possible to read out the image data and the distance distribution information, which are written in the second RAM 56 according to the DMA transfer, from the second RAM 56. Also, a bit, which corresponds to a memory area of the interruption cause register 58*a* in which the DMA transfer completion signal is stored, is cleared by the second microprocessor 54 through the signal line L10, so that the DMA transfer completion interruption signal supplied to the interruption terminal IN2 of the second microprocessor 54 is set to the inactive state. Also, image processing (or signal processing) is performed in the second microprocessor 54 according to the image data and the distance distribution information read out from the second RAM 56 to calculate a three-dimensional-position of a three-dimensional object or to calculate a right-side clearance distance and a left-side clearance distance, and a result of the image processing (or a calculation result) is written in a prescribed area of the DPRAM (1) 57*a* and a prescribed area of a DPRAM (3) 57*c* through the signal line L6.

A DPRAM 57 is divided into the DPRAM (1) 57*a*, the DPRAM (2) 57*b* and the DPRAM (3) 57*c*. The calculation result obtained in the first microprocessor 51 is temporarily stored in the DPRAM (2) 57*b*, and the calculation result obtained in the second microprocessor 54 is temporarily stored in the DPRAM (3) 57*c*. Therefore, the calculation result obtained in the first microprocessor 51 or the second microprocessor 54 can be suitably read out to a display control apparatus 60 through a signal line L11. Also, detection signals output from both a vehicle speed sensor 62 and a rudder angle sensor 63 are temporarily stored in the DPRAM (2) 57b and the DPRAM (3) 57c through the display control apparatus 60 and the signal line L11. Therefore, the detection signals of both the vehicle speed sensor 62 and the rudder angle sensor 63 can be suitably read out to the first microprocessor 51 and the second microprocessor 54 through the signal lines L3 and L6.

In addition, the calculation result of the first microprocessor 51 can be suitably read out to the second microprocessor 54 through the DPRAM (1) 57a and the signal lines L3 and L6, and the image processing is continued in the second microprocessor 54 to calculate the right-side clearance distance and the left-side clearance distance according to the calculation result (that is, the three-dimensional position of the white line or the side wall) of the first microprocessor 51. Also, the calculation result of the second microprocessor 54 can be suitably read out to the first microprocessor 51 through the DPRAM (1) 57a and the signal lines L3 and L6, and the image processing can be continued in the first microprocessor 51 by using the calculation result of the second microprocessor 54.

The interruption control circuit 58 has the interruption cause register 58a, which is connected with the first microprocessor 51, the second microprocessor 54 and the display control apparatus 60 through the signal lines L3, L4 and L11, and the interruption output register 58b which is connected with the first microprocessor 51, the second microprocessor 54 and the display control apparatus 60 through the signal lines L9, L10 and L11. When an interruption occurs in the first microprocessor 51, the second microprocessor 54 or the display control apparatus 60, an interruption cause is read out from the interruption cause register 58a to specify an interruption occurrence cause. That is, in cases where a bit indicating an interruption cause exists in the interruption cause register 58a, the bit of the interruption cause is cleared, and interruption processing corresponding to the interruption cause is performed in the first microprocessor 51, the second microprocessor 54 or the display control apparatus 60 indicated by the bit of the interruption cause under the control of the interruption control circuit 58. Also, a DMA transfer completion signal is sent from the DMA transfer circuit 50 to the interruption control circuit 58, a DMA transfer completion interruption signal is supplied from the interruption output register 58b to the interruption terminal INT1 (or INT2) of the first microprocessor 51 (or the second microprocessor 54) through the signal line L9 (or L10), and a communication interruption signal, which is obtained by setting a prescribed bit of the interruption output register 58b, is supplied from the interruption output register 58b to the interruption terminal INT1 of the first microprocessor 51, the interruption terminal INT2 of the second microprocessor 54 or an interruption terminal INT3 of the display control apparatus 60. Also, the calculation result of the first microprocessor 51 (or the second microprocessor 54) is written in the DPRAM (1) 57a and the DPRAM (2) 57b (or the DPRAM (2) 57b and the DPRAM (3) 57c). Thereafter, when a prescribed bit of the interruption output register 58b corresponding to the first microprocessor 51 (or the second microprocessor 54) is set to perform the interruption processing for the first microprocessor 51 (or the second microprocessor 54), the first microprocessor 51 (or the second microprocessor 54) is interrupted at prescribed intervals according to the communication interruption signal sent from the interruption control circuit 58.

In the display control unit 60, signals detected in both the vehicle speed sensor 62 and the rudder angle sensor 63 are received through the interface circuit 61, and a vehicle speed and a rudder angle of a steering wheel are calculated according to the signals. The calculation result of the display control unit 60 is written in the DPRAM (3) 57c through the signal line L11, and the prescribed bit of the interruption output register 58b corresponding to the first microprocessor 51 (or the second microprocessor 54) is set under the control of the display control unit 60 to perform a communication interruption to the first microprocessor 51 (or the second microprocessor 54) and to send the vehicle speed and the rudder angle of the steering wheel to the first microprocessor 51 (or the second microprocessor 54).

In contrast, when a communication interruption signal sent from the interruption control circuit 58 is received at the interruption terminal INT3 of the display control unit 60 through a signal line L8, in other words, when the communication interruption signal sent the interruption terminal INT3 of the display control unit 60 is set to an active state, the display control unit 60 accesses the interruption control circuit 58 through the signal line L11 to read out data temporarily stored in the interruption cause register 58a of the interruption control circuit 58, and it is judged by the display control unit 60 according to the data that the communication interruption is performed from the first microprocessor 51 (or the second microprocessor 54). Thereafter, the calculation result (for example, the three-dimensional position of the three-dimensional object or the clearance distances) of the first microprocessor 51 (or the second microprocessor 54), which is written in the DPRAM (2) 57b (or the DPRAM (3) 57c), is read out from the DPRAM (2) 57b (or the DPRAM (3) 57c) and is supplied to an external circuit (not shown) during the communication interruption.

Also, in the reading-out of the data temporarily stored in the interruption cause register 58a, in cases where the communication interruption signal indicating the interruption from the first microprocessor 51 (or the second microprocessor 54) to the display control unit 60 through the interruption control circuit 58 is not set to the active state for a prescribed time, in other words, in cases where the communication interruption signal set to the active state is not supplied from the interruption control circuit 58 to the interruption terminal INT3 of the display control unit 60, it is judged by the display control unit 60 that a failure occurs in the first microprocessor 51 (or the second microprocessor 54).

Also, in cases where a bus check request switch (not shown) arranged in the mode setting switch 64 is turned on, a bus check request signal is supplied from the mode setting switch 64 to the display control unit 60 through the interface circuit 61. Thereafter, an instruction signal is sent from the display control unit 60 to a bus access gate circuit 59 through the signal line L11 to make the bus access gate circuit 59 start the operation of a gate function (or a diagnosis operation).

In cases where the bus access gate circuit 59 is set to a state for starting the operation of the gate function according to the instruction signal sent from the display control unit 60, a DMA transfer prohibition signal is supplied from the bus access gate circuit 59 to the DMA transfer circuit 50 through the signal line L11 to prohibit the DMA transfer circuit 50 from performing the DMA transfer.

In cases where the DMA transfer prohibition signal is received in the DMA transfer circuit 50, the DMA transfer of the DMA transfer circuit 50 is compulsorily suspended even though the DMA transfer is now performed in the DMA transfer circuit 50, the DMA transfer circuit 50 is prohibited from outputting a signal through any of the signal lines L1, L4 and L12. In other words, the signals output from the DMA transfer circuit 50 through the signal lines L1, L4 and L12 are set to the inactive state. Thereafter, in cases where the DMA transfer prohibition signal supplied to the DMA transfer circuit 50 is cancelled to stop the supply of the DMA transfer prohibition signal to the DMA transfer circuit 50, the DMA transfer of the DMA transfer circuit 50 is restarted from a suspended position. However, in cases where a suspending time of the DMA transfer circuit 50 is equal to longer than a time corresponding to one frame of image data, the frame of image data and the distance distribution information obtained from the frame of image data, of which the DMA transfer is suspended, are abandoned, and the DMA transfer is restarted from a next frame of image data and distance distribution information obtained from the next frame of image data.

Microprocessor check data produced in the display control unit 60 is stored in a third ROM 65. The microprocessor check data is, for example, composed of data for identifying the first microprocessor 51 (or the second microprocessor 54), a check address of the first ROM 52 or the first RAM 53 (or the second ROM 55 or the second RAM 56) corresponding to the microprocessor and check data. In cases where the microprocessor check data read out from the third ROM 65 is received in the bus access gate circuit 59, the first microprocessor 51 (or the second microprocessor 54) is identified in the bus access gate circuit 59 according to the identifying data, and the bus right request signal BREQ1 (or the bus right request signal BREQ2) of the signal line L1 (or L4) is set to the active state. Thereafter, when the bus right acknowledgement signal BACK1 (or BACK2) of the signal line L2 (or L5) is changed to the active state, the check data is written to a prescribed address of the first microprocessor 51 (or the second microprocessor 54) by the bus access gate circuit 59.

Also, when it is ascertained by the bus access gate circuit 59 that the bus right acknowledgement signal BACK1 (or BACK2) output from the first microprocessor 51 (or the second microprocessor 54) to the signal line L2 (or L5) is set to the active state, the check address is set in an address signal which is output from the first microprocessor 51 (or the second microprocessor 54) to the signal line L3 (or L6), and the bus access gate circuit 59 accesses the first ROM 52 or the first RAM 53 (or the second ROM 55 or the second RAM 56) corresponding to the first microprocessor 51 (or the second microprocessor 54) according to the check address. In cases where a writing operation is performed by the bus access gate circuit 59, the check data, which is supplied from the display control circuit 60 and is stored in the third ROM 65, is written in the check address of the first ROM 52 or the first RAM 53 (or the second ROM 55 or the second RAM 56). Also, in cases where a reading operation is performed by the bus access gate circuit 59, check data stored in the check address of the first ROM 52 or the first RAM 53 (or the second ROM 55 or the second RAM 56) is read out from the first microprocessor 51 (or the second microprocessor 54), and the check data is supplied to the display control circuit 60 through the signal line L11.

Thereafter, it is judged by the display control circuit 60 whether or not the check data, which is written in the first ROM 52 or the first RAM 53 (or the second ROM 55 or the second RAM 56) of the first microprocessor 51 (or the second microprocessor 54) and is read out from the first ROM 52 or the first RAM 53 (or the second ROM 55 or the second RAM 56), agrees with the check data stored in the third ROM 65. In cases where it is judged by the display control circuit 60 that the check data of the first ROM 52 or the first RAM 53 (or the second ROM 55 or the second RAM 56) differs from the check data of the third ROM 65, it is judged by the display control circuit 60 that a failure occurs in the first ROM 52 or the first RAM 53 (or the second ROM 55 or the second RAM 56) corresponding to the check data.

Next, an operation of the image signal processing circuit having the above-described configuration is described with reference to FIG. 2, FIG. 3, FIG. 4 and FIG. 5.

FIG. 2(A) to FIG. 2(N) are a plurality of timing charts showing an operation of the image signal processing circuit shown in FIG. 1, FIG. 3(A) to FIG. 3(O) are a plurality of timing charts showing another operation of the image signal processing circuit shown in FIG. 1, FIG. 4(A) to FIG. 4(L) are a plurality of timing charts showing a DMA transfer operation of the image signal processing circuit shown in FIG. 1, and FIG. 5(A) to FIG. 5(L) are a plurality of timing charts showing another DMA transfer operation of the image signal processing circuit shown in FIG. 1. In this embodiment, though an execute program of the first microprocessor 51 differs from that of the second microprocessor 54, hardware of the first microprocessor 51 is the same as that of the second microprocessor 54, and the first microprocessor 51 is operated in the same manner as the operation of the second microprocessor 54. Therefore, the first microprocessor 51 is representatively used in this embodiment. Also, the operation corresponding to the second microprocessor 54 is shown in FIG. 2(H) to FIG. 2(N) and FIG. 4(G) to FIG. 4(L).

The DMA transfer operation performed in the DMA transfer circuit 50 is described.

When the image data and the distance distribution information produced from the image data are supplied from the image processor 20 to the DMA transfer circuit 50 (time period "data transfer from image processor" of FIG. 2(F)), a bus right request signal BREQ1, which is sent to the first microprocessor 51 through the signal line L1, is set to the active state by the DMA transfer circuit 50 (low level state of FIG. 2(A)). Thereafter, the execution of a program is temporarily suspended in the first microprocessor 51 in which the bus right request signal BREQ1 set to the active state is received, a bus right acknowledgement signal BACK1 is set to the active state by the first microprocessor 51 (low level state of FIG. 2(B)), and the bus right acknowledgement signal BACK1 set to the active state is supplied to the DMA transfer circuit 50 to give the bus right to the DMA transfer circuit 50.

When the bus right acknowledgement signal BACK1 set to the active state is received in the DMA transfer circuit 50 (P1 in FIG. 2(G)), as shown in FIG. 2(E) and FIG. 2(G), normal processing, in which data is output from the first microprocessor 51 (or the second microprocessor 54), is changed to the DMA transfer operation in which data is output from the DMA transfer circuit 50. Thereafter, the image data and the distance distribution information are written in the first RAM 53 or the second RAM 56 through the signal line L3 or L6 (time period "DMA transfer" of FIG. 2(E)). When this writing operation is completed 'P2 in FIG. 2(G)), the bus right request signal BREQ1 set to the inactive state is sent from the DMA transfer circuit 50 to the first microprocessor 51 (or the second microprocessor 54). When the bus right request signal BREQ1 set to the inactive state is received in the first microprocessor 51 (or the second microprocessor 54) (low level state of FIG. 2(C)), the execution of the program is restarted in the first microprocessor 51. Also, a DMA transfer completion signal is sent from the DMA transfer circuit 50 to the interruption control circuit 58, a DMA transfer completion interruption signal is sent from the interruption control circuit 58 to the interruption terminal INT1 of the first microprocessor 51 and the interruption terminal INT2 of the second microprocessor 54), and a cause bit corresponding to the DMA transfer completion is set in the interruption cause register 58a by the DMA transfer circuit 50 (time period "request for DMA transfer completion interruption" of FIG. 2(D)).

For example, when the signal of the interruption terminal INT1 is set to the active state (time period "request for DMA transfer completion interruption" of FIG. 2(D)), the first microprocessor 51 accesses the interruption cause register 58a of the interruption control circuit 58 through the signal line L3 (refer to FIG. 2(E)). In cases where data of the interruption cause register 58a indicates the DMA transfer completion interruption, the cause bit of the interruption cause register 58a is cleared by the first microprocessor 51, the image data and the distance distribution information, which are written in the DMA transfer operation at the occurrence time of the DMA transfer completion interruption signal, are read out from the first RAM 53 to the first microprocessor 51 (refer to FIG. 2(D) and FIG. 2(E)), image processing (or signal processing) is performed for the image data and the distance distribution information in the first microprocessor 51, and a calculation result obtained in the image processing is written in the DPRAM (1) 57a (refer to FIG. 4(D) and FIG. 4(E)). That is, the calculation result of the first microprocessor 51 is written in the DPRAM (1) 57a and the DPRAM (2) 57b, and the calculation result of the second microprocessor 54 is written in the DPRAM (2) 57b and the DPRAM (3) 57c. Also, a prescribed bit of the interruption output register 58b corresponding to an interruption request for the first microprocessor 51 (or the second microprocessor 54) is set, and the interruption control circuit 58 performs a communication interruption to the first microprocessor 51 (or the second microprocessor 54).

Also, when the signal of the interruption terminal INT2 is set to the active state (low level state in FIG. 4(I)), the second microprocessor 54 accesses the interruption cause register 58a of the interruption control circuit 58 through the signal line L4, the cause bit of the interruption cause register 58a is cleared by the second microprocessor 54, and the image data and the distance distribution information written in the DPRAM (3) 57c are read out to the second microprocessor 54 (high level state of FIG. 4(L)).

In the display control unit 60, signals sent from the vehicle speed sensor 62 and the rudder angle sensor 63 are read out through the interface circuit 61. Thereafter, a calculating operation is performed in the display control unit 60 according to the signals, and a calculation result of the display control unit 60 is written in the DPRAM (3) 57c or DPRAM (2) 57b through the signal line L11. Also, interruption request instruction data is written in the interruption output register 58b of the interruption control circuit 58 under the control of the display control unit 60 to make the interruption control circuit 58 perform a communication interruption to the first microprocessor 51 or the second microprocessor 54.

Also, in cases where it is judged by the display control unit 60 that interruption request instruction data is written in the interruption output register 58b of the interruption control circuit 58 by the first microprocessor 51 (or the second microprocessor 54) to perform an interruption the first microprocessor 51 (or the second microprocessor 54) to the display control unit 60, an interruption signal is supplied from the interruption output register 58b to the interruption terminal INT3 of the display control unit 60 through the signal line L8.

Also, when the interruption signal of the interruption terminal INT3 sent through the signal line L8 is set to the active state, the display control unit 60 accesses the interruption cause register 58a of the interruption control circuit 58 through the signal line L11, and it is judged by the display control unit 60 whether the interruption to the display control unit 60 is performed by the first microprocessor 51 or the second microprocessor 54. In this judgment, in cases where it is detected by the display control unit 60 that no data is written in the interruption cause register 58a and no interruption is performed by the first microprocessor 51 or the second microprocessor 54 for a prescribed time, it is judged by the display control unit 60 that a failure occurs in the first microprocessor 51 or the second microprocessor 54.

In cases where the mode setting switch 64 is turned on, a bus check request signal is supplied from the mode setting switch 64 to the display control unit 60 through the interface circuit 61, and a signal indicating that the mode setting switch 64 is turned on is supplied from the display control unit 60 to the bus access gate circuit 59 through the signal line L11.

Next, diagnosis of the first microprocessor 51 or the second microprocessor 54 is described.

In cases where the signal indicating that the mode setting switch 64 is turned on is supplied from the display control unit 60 to the bus access gate circuit 59, a DMA transfer prohibition signal is supplied from the bus access gate circuit 59 to the DMA transfer circuit 50 to prohibit the DMA transfer circuit 50 from performing the DMA transfer operation. When the DMA transfer circuit 50 receives the DMA transfer prohibition signal, the DMA transfer operation of the DMA transfer circuit 50 is compulsorily suspended even though the DMA transfer operation is now performed in the DMA transfer circuit 50, and the signals output to the signal lines L1 and L2 are set to the inactive state. As a result, as shown in FIG. 3(A), FIG. 3(B) and FIG. 3(C), a normal operation of the first microprocessor 51 is suspended, a diagnosis operation is performed in the first microprocessor 51. During the diagnosis operation, the DMA transfer circuit 50 is prohibited from outputting the signals from the signal lines L1 and L4, and a signal is output from the bus access gate circuit 59 to the first microprocessor 51 (or the second microprocessor 54) through the signal line L1 (or L4).

Also, in cases where it is ascertained by the bus access gate circuit 59 that the bus right acknowledgement signal BACK 1 (or BACK2) set to the active state is output from the first microprocessor 51 (or the second microprocessor 54) to the signal line L2 (or L5), a check address corresponding to the first microprocessor 51 (or the second microprocessor 54) is set in the bus access gate circuit 59, and the bus access gate circuit 59 accesses the first ROM 52 or the first RAM 53 (or the second ROM 55 or the second RAM 56) corresponding to the first microprocessor 51 (or the second microprocessor 54) according to the check address. In cases where a writing operation is performed by the bus access gate circuit 59, check data, which is supplied from the display control circuit 60, is written to the check address of the first ROM 52 or the first RAM 53 (or the second ROM 55 or the second RAM 56). Also, in cases where a reading operation is performed by the bus access gate circuit 59, check data stored in the check address of the first ROM 52 or the first RAM 53 (or the second ROM 55 or the second RAM 56) is read out from the first microprocessor 51 (or the second microprocessor 54), and the check data is supplied to the display control circuit 60 through the signal line L11.

Thereafter, it is judged by the display control circuit 60 whether or not the check data, which is written in the first ROM 52 or the first RAM 53 (or the second ROM 55 or the second RAM 56) of the first microprocessor 51 (or the second microprocessor 54) and is read out from the first ROM 52 or the first RAM 53 (or the second ROM 55 or the second RAM 56), agrees with the check data stored in the third ROM 65. In cases where it is judged by the display control circuit 60 that the check data of the first ROM 52 or the first RAM 53 (or the second ROM 55 or the second RAM 56) differs from the check data of the third ROM 65, it is judged by the display control circuit 60 that a failure occurs in the first ROM 52 or the first RAM 53 (or the second ROM 55 or the second RAM 56) corresponding to the check data.

Also, when the diagnosis operation of the first microprocessor 51 (or the second microprocessor 54) is completed, an OFF signal is supplied from the display control circuit 60 to the bus access gate circuit 59 through the signal line L11. Therefore, the DMA transfer prohibition signal, which prohibits the DMA transfer circuit 50 from performing the DMA transfer operation, is set to the inactive state by the bus access gate circuit 59. That is, the DMA transfer prohibition signal supplied to the DMA transfer circuit 50 is cancelled. In addition, the bus access gate circuit 59 prohibits the DMA transfer circuit 50 from outputting a signal to the signal line L1 (or L4). When information of the cancellation of the DMA transfer prohibition signal is sent from the bus access gate circuit 59 to the DMA transfer circuit 50, the DMA transfer operation is restarted in the DMA transfer circuit 50, and the prohibition of the signal output to the signal line L1 (or L4) is cancelled. However, in cases where a prohibition time for the signal output from the DMA transfer circuit 50 to the signal line L1 (or L4) is equal to longer than a time corresponding to one frame of image data, the frame of image data, for which the DMA transfer operation is prohibited, is abandoned, and the DMA transfer operation is restarted from a next frame of image data and distance distribution information obtained from the next frame of image data.

As is described above, in this embodiment, a plurality of dedicated buses (or dedicated signal lines) are prepared for each microprocessor, and a dedicated ROM and a dedicated RAM are arranged for each microprocessor. That is, the signal lines L1, L2, L3 and L9, the first ROM 52 and the first RAM 53 are used for the first microprocessor 51, and the signal lines L4, L5, L6 and L10, the second ROM 55 and the second RAM 56 are used for the second microprocessor 54. Also, the DMA transfer circuit 50 is arranged to write image data (or a stereo image) and distance distribution information in the RAM corresponding to each microprocessor by interrupting the execution of a program used in the microprocessor. In addition, the DPRAM 57 is arranged to perform data communication between the microprocessors. Accordingly, the processing time required to process the image data and the distance distribution information in each microprocessor can be shortened. That is, the image data and the distance distribution information can be efficiently sent to the RAM of each microprocessor through the DMA transfer circuit 50, and the processing for the image data and the distance distribution information can be smoothly performed in each microprocessor.

Also, in cases where a watch dog timer is arranged in each microprocessor to detect runaway of the program execution in the microprocessor, the operation of the microprocessor can be reset in case of the runaway.

Also, communication interruption from each microprocessor to the display control unit 60 is monitored in a displaying unit 66 to detect a failure, a failure of a signal line (or a bus line) connecting the display control unit 60 and the other microprocessor is detected by using the bus access gate circuit 59, and the occurrence of the failure is output to the displaying unit 66. Accordingly, the reliability of the image signal processing circuit can be improved.

Also, each signal line (or bus line) connected with each microprocessor can be checked through the display control unit 60 by using the bus access gate circuit 59.

Also, in cases where a flash ROM is used for the first ROM 52 or the second ROM 55, data stored in the first ROM 52 or the second ROM 55 can be rewritten through the display control unit 60. Also, the image data and the distance distribution information written in the first RAM 53 or the second RAM 56 and control data (or a calculation result) obtained from the image data and the distance distribution information in the image processing can be read out through the display control unit 60.

In this embodiment, it is applicable that each of the ROMs 52, 55 and 65 be formed of a flash memory or an electrically erasable programmable ROM (EEPROM).

What is claimed is:

1. An image signal processing circuit comprising:
   a plurality of image data outputting units for outputting a plurality of pieces of image data;
   an image processor for outputting the pieces of image data output from the image data outputting units as a frame of image data;
   a plurality of random access memories for respectively storing the frame of image data output from the image processor; and
   a plurality of central processing units, which are arranged in one-to-one correspondence with the random access memories, for respectively performing signal processing according to the frame of image data stored in the corresponding random access memory, characterized in that the image signal processing circuit further comprises
   a direct memory access transfer circuit, which is arranged between the image processor and the group of central processing units, for interrupting the signal processing of one central processing unit, writing the frame of image data output from the image processor in one random access memory corresponding to the central processing unit, making the central processing unit restart the signal processing after the writing of the frame of image data in the random access memory and sending information, which indicates that the frame of image data is written in the random access memory during the interruption of the central processing unit, to the central processing unit.

2. An image signal processing circuit according to claim 1, wherein the direct memory access transfer circuit writes the same frame of image data output from the image processor in each of the random access memories, and a type of the signal processing, which is performed in each central processing unit according to the frame of image data written in the corresponding random access memory, differs from types of the signal processing performed in the other central processing units.

3. An image signal processing circuit according to claim 2, wherein a distance calculation is performed in one of the central processing units, and the formation of a three-dimensional image is performed in another central processing unit.

4. An image signal processing circuit according to claim 2, further comprising a DPRAM, which is connected with the central processing units, for storing a plurality of calculation results obtained according to the signal processing performed in the central processing units so as to be possible to use any of the calculation results in each central processing unit.

5. An image signal processing circuit according to claim 2, further comprising an interruption control circuit, which is connected with the central processing units, for controlling the interruption of each central processing unit to interrupt one central processing unit in cases where a calculation result obtained according to the signal processing performed in another central processing unit is supplied to the interrupted central processing unit.

6. An image signal processing circuit according to claim 2, further comprising a display control unit for controlling the display of a calculation result which is obtained in each central processing unit according to the signal processing and is sent from the central processing unit through a DPRAM at regular intervals, wherein the display control unit has a failure judging unit for judging that a failure occurs in one central processing unit in cases where the calculation result of the central processing unit is not sent to the DPRAM.

7. An image signal processing circuit according to claim 2, further comprising:

a display control-unit for setting an address corresponding to one central processing unit; and a bus access gate circuit for outputting a bus release request signal to the central processing unit corresponding to the address set by the display control unit, outputting a signal to the direct memory access transfer circuit to interrupt a direct memory access transfer of the direct memory access transfer circuit, ascertaining that the central processing unit releases a bus, and reading out or writing data from/in a memory or the random access memory corresponding to the central the random access memory corresponding to the central processing unit.

8. An image signal processing circuit according to claim 2, further comprising a bus access gate circuit for supplying diagnosis data and an address of the diagnosis data to one central processing unit corresponding to a diagnosis operation, writing the diagnosis data in the address of a memory of the central processing unit, and reading out the diagnosis data from the memory of the central processing unit; and a comparing circuit for comparing the diagnosis data read out by the bus access gate circuit with the diagnosis data supplied to the central processing unit by the bus access gate circuit to perform the diagnosis of the memory of the central processing unit.

9. A vehicle running guiding apparatus according to claim 1, wherein the image processor is applied to a stereo image processing unit for calculating a three-dimensional distance distribution in a stereo image which is obtained by photographing a three-dimensional object, which is placed in a forward direction of travel of a vehicle, with a pair of photographing units arranged on the right and left sides of the vehicle, one central processing unit is applied to a three-dimensional object detecting unit for detecting a three-dimensional position of the three-dimensional object placed on a road according to the three-dimensional distance distribution calculated by the stereo image processing unit, another central processing for calculating a right-side nearest distance between an end of the three-dimensional object, of which the three-dimensional position is detected by the three-dimensional object detecting unit, and an extending line of a right end of the vehicle, calculating a left-side nearest distance between another end of the three-dimensional object and an extending line of a left end of the vehicle and setting both the right-side nearest distance and the left-side nearest distance as a clearance distance, and the vehicle running guiding apparatus further comprises an informing unit for informing information indicating the clearance distance calculated by the clearance distance calculating unit.

10. An image signal processing circuit according to claim 1, wherein a program used to perform the signal processing in each central processing unit is stored in a flash memory or an electrically erasable programmable ROM (EEPROM).

* * * * *